United States Patent
Chen et al.

(10) Patent No.: US 7,420,460 B2
(45) Date of Patent: Sep. 2, 2008

(54) VEHICLE SECURITY SYSTEM

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 258 days.

(21) Appl. No.: 11/341,580

(22) Filed: Jan. 30, 2006

(65) Prior Publication Data

US 2007/0018798 A1    Jan. 25, 2007

(30) Foreign Application Priority Data

Jul. 25, 2005   (TW) .............................. 94125095 A

(51) Int. Cl.
*B60Q 1/00* (2006.01)

(52) U.S. Cl. ............ 340/425.5; 340/426.1; 340/426.13; 340/429

(58) Field of Classification Search ............. 340/425.5, 340/426.1, 426.13, 426.14, 426.36, 5.1, 5.2, 340/5.7, 5.72, 429
See application file for complete search history.

(56) References Cited

U.S. PATENT DOCUMENTS

| | | | | |
|---|---|---|---|---|
| 4,845,464 A | * | 7/1989 | Drori et al. | 340/429 |
| 5,334,969 A | * | 8/1994 | Abe et al. | 340/426.26 |
| 6,028,507 A | * | 2/2000 | Banks et al. | 340/427 |
| 6,452,484 B1 | * | 9/2002 | Drori | 340/426.13 |
| 6,853,301 B2 | * | 2/2005 | Devine | 340/571 |
| 2002/0003472 A1 | * | 1/2002 | Haruna et al. | 340/426 |

* cited by examiner

*Primary Examiner*—George A Bugg
*Assistant Examiner*—Travis R Hunnings
(74) *Attorney, Agent, or Firm*—Bacon & Thomas, PLLC

(57) ABSTRACT

Disclosed is a vehicle security system, which includes a security controller and a remote controller. The security controller is electrically connected to sensors and alarms, respectively, and has a memory storing an anti-thief alert grade table. The anti-thief alert grade table records at least two alert grades each having a respective sensitivity default value corresponding to each sensor. The sensitivity default value of each alert grade for each sensor defines the critical actuation value of the respective sensor for the respective alert grade. The remote controller has a control button for pressing to control the security controller to enter the desired alert grade of the alert mode.

6 Claims, 3 Drawing Sheets

VEHICLE SECURITY SYSTEM

BACKGROUND OF THE INVENTION

1. Field of the Invention

The present invention relates to a security system for a vehicle and more particularly, to such a vehicle security system, which allows the user to selectively adjust the alert grade.

2. Description of Related Art

Regular vehicles are commonly equipped with a security system for protection against thieves. A vehicle security system is known comprising a security controller mounted in the car, a plurality of sensors installed in the car at different locations and electrically connected to the security controller, and a remote controller carried by the car owner. Immediately after leaving the car, the car owner will press the control button of the remote controller to activate the alert mode of the security system. However, regular vehicle security systems provide only one single alert grade, i.e., the sensitivity of the sensors that are electrically connected to the security controller is fixed. Further, a vehicle may be parked in any climatic environment, for example, fine and cloudless weather, thunderous weather, snowy weather, etc. The sensitivity of the sensors of a vehicle security system that suits fine and cloudless weather may be not suitable for a thunderous or stormy weather. It is frequently seen that the alarm of the security system of a car alarms due to a sharp weather change, especially in abrupt changes of atmospheric pressure.

Further, parking a car in a different place may require a different alert grade. For example, the alert grade may be relatively lowered when parking the car in the house. On the contrary, the alert grade should be relatively higher if the car is parked in the street.

Therefore, it is desirable to provide a vehicle security system that allows the user to adjust the alert grade to suit different conditions.

SUMMARY OF THE INVENTION

The present invention has been accomplished under the circumstances in view. It is one object of the present invention to provide a vehicle security system so as to provide a vehicle security system having a plurality of alert grades. It is another object of the present invention to provide a vehicle security system, which allows the user to set the alert grade according to different conditions.

To achieve these and other objects of the present invention, the vehicle security system includes a security controller and a remote controller. The security controller has at least one sensor and at least one alarm device electrically connected thereto. The security controller can be set between an alert mode and a non-alert mode. The security controller includes a memory. The memory stores an anti-thief alert grade table recording at least two alert grades. The alert grades each include a respective sensitivity default value corresponding to the at least one sensor. The at least one respective sensitivity default value defines the critical actuation value of the corresponding at least one sensor under the respective alert grade. The remote controller includes at least one control button for selecting one of the alert grades, and remotely driving the security controller to enter the selected alert grade of the alert mode. The at least two alert grades include a first alert grade and a second alert grade. The sensitivity default value of the first alert grade is greater than the sensitivity default value of the second alert grade. The at least two alert grades further include a third alert grade. The sensitivity default value of the second alert grade is greater than the sensitivity default value of the third alert grade.

The remote controller sends a control signal to the security controller when one control button is pressed, causing the security controller to set the corresponding alert grade for the at least one sensor subject to the nature of the control signal produced.

The security controller enters the selected alert grade of the alert mode if the at least one control button is pressed and is not pressed again within a predetermined time.

The at least one alarm device includes a buzzer and a directional light. When the at least one control button is pressed and is pressed again after the predetermined time, the security controller controls the buzzer to produce a corresponding short sharp sound and does not change the current selected alert grade of the alert mode. Further, when one control button is pressed, the remote controller sends a control signal to the security controller, causing the security controller to drive the buzzer to produce a corresponding short sharp sound.

Further, the aforesaid memory means can be a nonvolatile memory, for example, an Erasable Programmable Read-Only Memory, an Electronically Erasable Programmable Read-Only Memory, an OTP ROM, a Flash Memory, or a Mask ROM.

Further, the aforesaid at least one sensor can be a vibration sensor, a pressure sensor, or a tilt sensor.

DETAILED DESCRIPTION OF THE PREFERRED EMBODIMENT

Figure 1:
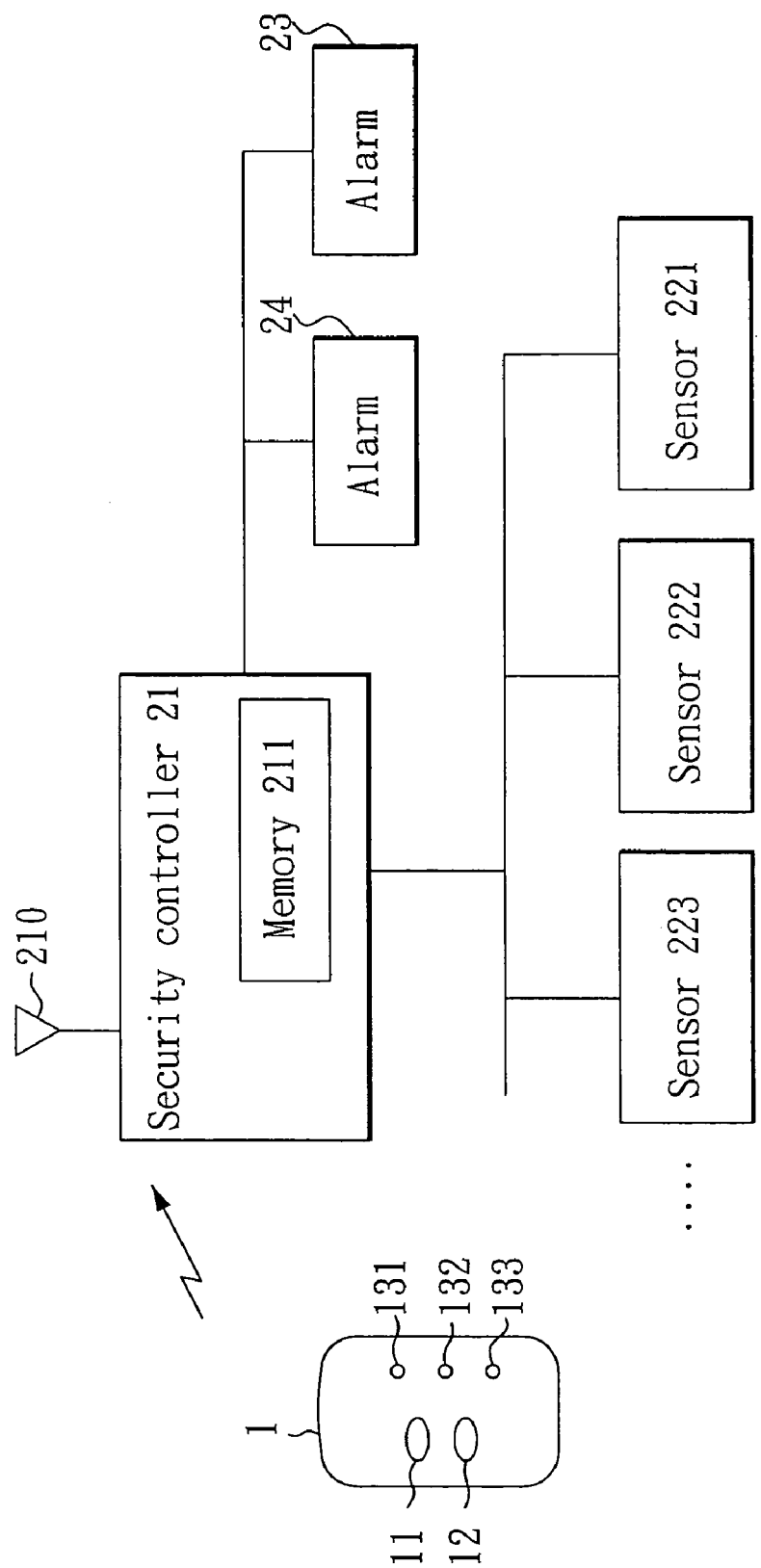
FIG. 1 is a system block diagram of a vehicle security system according to a first embodiment of the present invention.

The present invention will now be described by way of example. FIG. 1 is a system block diagram according to the first preferred embodiment of the present invention. As illustrated, the vehicle security system includes a remote controller 1 and a security controller 21. The remote controller 1 further includes a control button 11, a disable button 12, and indicator lights 131, 132, 133.

The security controller 21 includes a memory 211 and an antenna 210. Further, sensors 221, 222, 223 and alarms 23, 24 are electrically connected to the security controller 21, respectively. In addition, the security controller 21, the sensors 221, 222, 223 and the alarms 23, 24 are installed in a car.

The security controller 21 can be set between the alert (enabled) mode and the non-alert (disabled) mode. For example, the car owner can set the vehicle security system into the alert mode via pressing the control button 11, or set the vehicle security system into the non-alert mode via pressing the disable button 12.

When leaving the car, the car owner can use the remote controller 1 to selectively set the security controller 21 into different alert grades of alert mode. In this embodiment, the security controller 21 provides three alert grades for selection. The sensitivity of the sensors 221, 222, 223 is relatively adjusted subject to the alert grade selected.

For example, the security controller 21 can be set into alert grade 1, alert grade 2, and alert grade 3. The sensitivity default value at alert grade 1 is greater than the sensitivity default value at alert grade 2 and the sensitivity default value at alert grade 2 is greater than the sensitivity default value at alert grade 3. Namely, the relatively lower alert grade level has a relatively less sensitive sensitivity default value. Therefore, the sensors 221, 222, 223 have the highest sensitivity when at alert grade 3, or the lowest sensitivity when at alert grade 1.

In other embodiments, the sensors 221, 222, 223 can be set to have the highest sensitivity when at alert grade 1, or the lowest sensitivity when at alert grade 3. Further, in other embodiments, the security controller 21 can be constructed to provide two alert grades, or more than three alert grades.

Before explaining the way that the remote controller 1 controls the setting of the alert mode of the security controller 21 for various alert grades, the detailed description of component parts of the vehicle security system is described hereinafter.

In this embodiment, the alarm 23 is a buzzer, and the alarm 24 is a directional light.

In this embodiment, the sensor 221 is a pressure sensor mounted inside the car to detect the internal air pressure of the car. When the internal air pressure of the car is changed (for example, when the car door is opened, the internal air pressure of the car is changed and becomes equal to the atmospheric pressure), the sensor 221 is induced to produce a pressure detection signal and to send this pressure detection signal to the security controller 21 for further processing.

In this embodiment, the sensor 222 is a vibration sensor mounted in the car at any desired location to detect an abnormal vibration of the car. For example, if the car window of the car is broken after the security controller 21 has entered the alert mode, the sensor 222 is induced to produce a vibration detection signal and to send this vibration detection signal to the security controller 21 for further processing.

In this embodiment, the sensor 223 is a tilt sensor installed in the chassis of the car to detect abnormal tilting of the car. For example, if the car is being moved after the security controller 21 has entered the alert mode, the sensor 223 is induced to produce a tilt detection signal and to send this tilt detection signal to the security controller 21 for further processing.

In this embodiment, one pressure sensor 221, one vibration sensor 222 and one tilt sensor 223 are used. In other embodiments, the quantity and type of the sensors may be changed in accordance with actual requirements.

Further, every car manufacturer may provide different sensors for different models of cars they produce.

Figure 2:
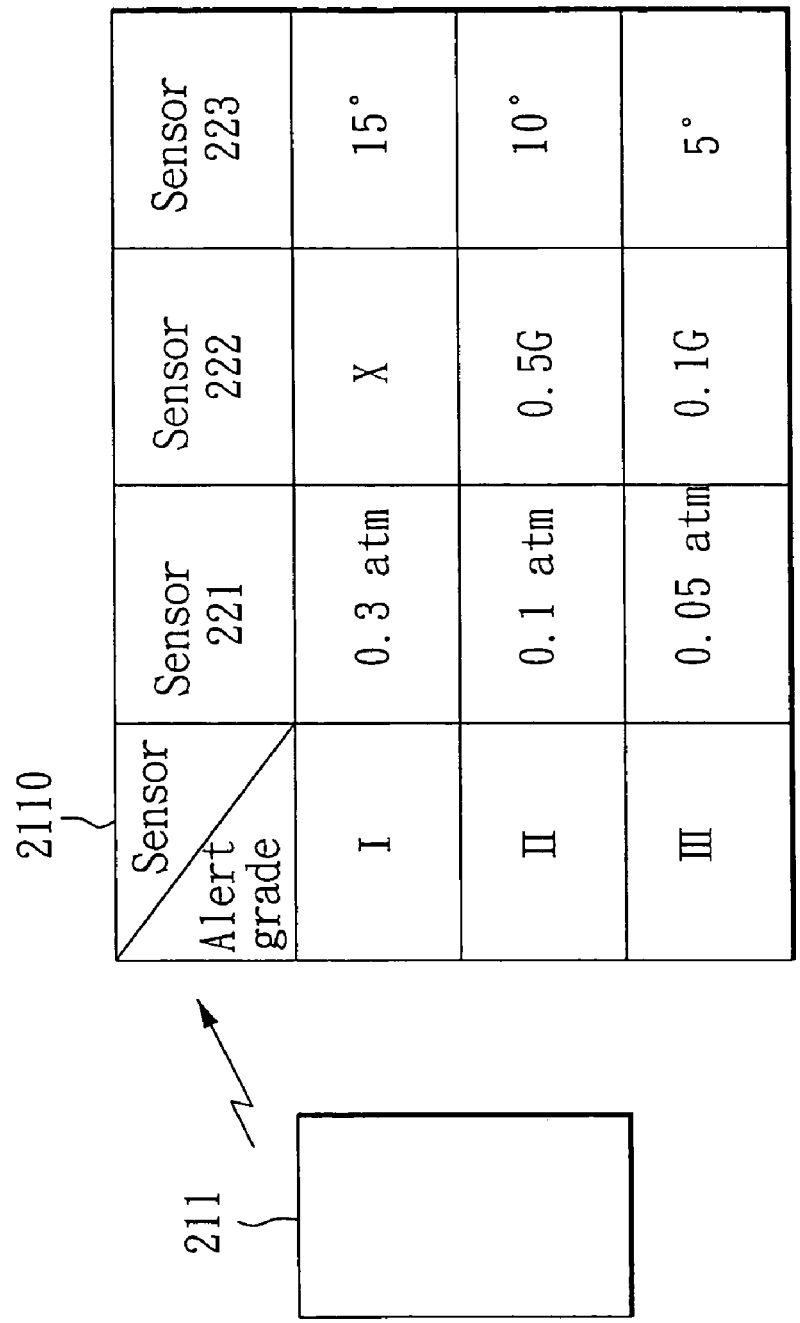
FIG. 2 is a schematic drawing showing the storage content of the memory unit of the vehicle security system according to the present invention.

FIG. 2 is a schematic drawing showing the content of the memory 211 of the security controller 21. The memory 211 stores an anti-thief alert grade table 2110, which records three alert grades (Grade I, Grade II, Grade III). There are sensitivity default values respectively corresponding to the sensors 221, 222, 223 in each of the alert grades (Grade I, Grade II, Grade III). In addition, every sensitivity default value defines the critical actuation value of the respective sensor corresponding to the respective alert grade.

For example, when the car door is opened and the pressure difference between the internal air pressure of the car and the outside atmospheric pressure is caused to be 0.3 atm after the security controller 21 has been set for the alert mode Grade 1, the pressure sensor 211 is induced to output a pressure detection signal to the security controller 21. Under the alert mode Grade I, the security controller 21 can be set to have the vibration sensor 222 be turned off to do no work, or to have the tilt sensor 223 be induced only after the car has been tilted over 15 degrees relative to a horizontal surface on which the car is parked.

Similarly, when the car door is opened and the pressure difference between the internal air pressure of the car and the outside atmospheric pressure is caused to be 0.1 atm after the security controller 21 has been set for the alert mode Grade 2, the pressure sensor 221 is induced to output a pressure detection signal to the security controller 21. Under the alert mode Grade 2, the vibration sensor 222 can be set to produce a vibration detection signal when detecting a vibration force 0.5 G, or the security controller 21 can be set to have the tilt sensor 223 to be induced only after the car has been tilted over 10 degrees relative to the horizontal surface on which the car is parked.

Under alert mode Grade 3, the pressure sensor 221 can be set to produce a pressure detection signal when the pressure difference between the internal air pressure of the car and the outside atmospheric pressure reaches 0.05 atm, or the vibration sensor 222 can be set to produce a vibration detection signal when detecting a vibration force 0.1 G, or the tilt sensor 223 can be set to produce a tilt detection signal when the car is tilted over 5 degrees relative to the horizontal.

Further, the memory 211 can be a nonvolatile memory so that the anti-thief alert grade table 2110 is maintained in the memory when a power supply fails or is turned off. Further, the memory can update the data stored, so that the anti-thief alert grade table 2110 is relatively updated when updating the vehicle security system, for example, adding new sensors or changing the critical actuation value.

In this embodiment, the memory 211 is an EPROM (Erasable Programmable Read-Only Memory). Alternatively, the memory 211 can be an EEPROM (Electrically Erasable Programmable Read-Only Memory), an OTP ROM, a Flash Memory, or a Mask ROM.

Referring to FIGS. 1 and 2 again, after the owner has parked and left the car, the car owner can press the control button 11 of the remote controller 1 to output a control signal to the security controller 21 wirelessly. Upon receipt of the control signal from the remote controller 1 through the antenna 210, the security controller 21 sets the alert grade of the sensors 221, 222, 223 based on the received control signal and the definition of the anti-thief alert grade table 2110.

In this embodiment, the buzzer 23 of the security controller 21 produces a corresponding short sharp sound and the directional light 24 flashes once when the car owner presses the control button 11. At this time, the indicator light 131 of the security controller 1 is turned on to emit light, giving to the car owner the message that the security controller 21 has been set for the alert mode Grade 1. If the car owner does not press the control button 11 again within a predetermined time, e.g., 3 seconds, the security controller 21 directly enters the alert mode Grade 1, and at the same time the security controller 21 also sets the sensors 221, 222, 223 for the alert mode Grade 1, i.e., the critical actuation values of the sensors 221, 222, 223 are equal to the respective default values set in the anti-thief alert grade table 2110 corresponding to Grade 1.

If the car owner presses the control button 11 again within the predetermined time (for example, 3 seconds), the remote controller 1 will send the control signal to the security controller 21 again. Upon receipt of this secondary control signal through the antenna 210, the security controller 21 controls the buzzer 23 to produce a corresponding short sharp sound and the directional light 24 to flash once. Because the security controller 21 receives the control signal twice within the predetermined time, the alert mode is set for the alert mode Grade 2, and the indicator light 132 of the security controller 1 will be turned on to emit light, giving to the car owner the message that the security controller 21 has been set for the alert mode Grade 2.

Similarly, if the car owner does not press the control button 11 again within a predetermined time (for example, 3 seconds) at this time, the security controller 21 will directly enter the alert mode Grade 2, and will also set the critical actuation values of the sensors 221, 222, 223 to be the respective default values set in the alert grade table 2110 corresponding to Grade 2.

If the car owner presses the control button 11 within the predetermined time (for example, 3 seconds) after having pressed the control button 11 twice, the security controller 21 will be set for the alert mode Grade 3, and the security controller 21 will control the buzzer 23 to produce a corresponding short sharp sound and the directional light 24 to flash once. Further, the indicator light 133 of the remote controller 1 will be turned on to emit light at this time, giving the message that the security controller 21 has been set into the alert mode Grade 3.

If the car owner does not press the control button 11 again within a predetermined time (for example, 3 seconds) at this time, the security controller 21 will directly enter the alert mode Grade 3, and will also set the critical actuation values of the sensors 221, 222, 223 to be the respective default values set in the anti-thief alert grade table 2110 corresponding to Grade 3.

Because the security controller 21 provides only three different grades for the alert mode, the security controller 21 will be kept in the alert mode Grade 3 and the security controller 21 will drive the buzzer 23 to buzz once and the directional light 24 to flash once if the car owner presses the control button 11 within a predetermined time (for example, 3 seconds) after the third pressed action.

Alternatively, the security controller 21 can be set to provide two alert grades, or more than three alert grades, and the security controller 21 will be kept in the highest alert grade if the user presses the control button 11 again within a predetermined time after setting of the security controller 21 for the highest grade of the alert mode.

In other embodiments, the security controller 21 will be properly shifted from one grade to another relatively lower grade upon each pressing of the control button 11 by the user within a predetermined time after the security controller 21 has been set for the highest grade of the alert mode. If the user keeps pressing the control button 11 within the predetermined time at this time after the security controller 21 has been set for the lowest alert grade, the level of the alert mode will be continuously changed in proper order from the lowest alert grade toward the highest alert grade.

Figure 3:
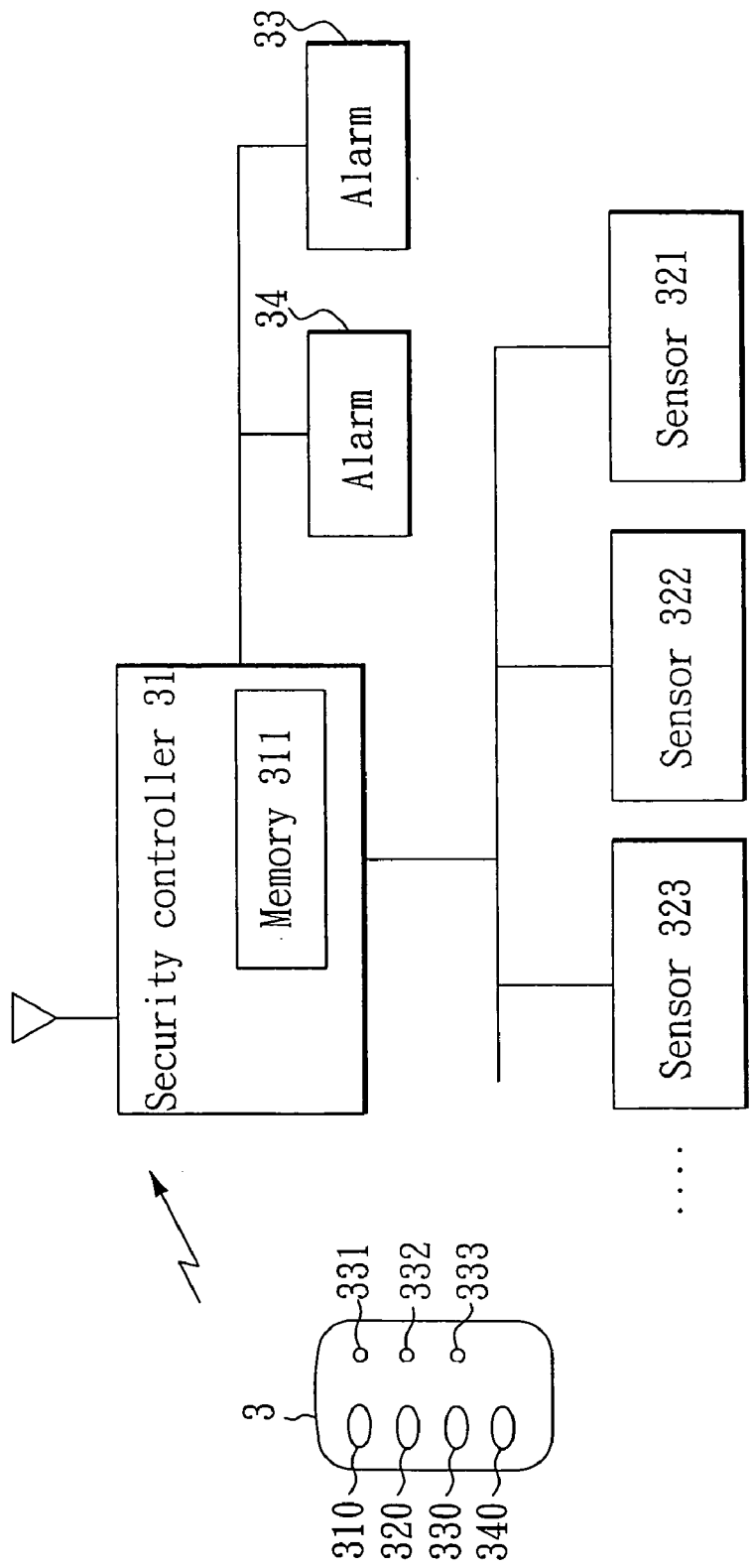
FIG. 3 is a system block diagram of a vehicle security system according to a second embodiment of the present invention.

FIG. 3 is a system block diagram of a vehicle security system according to the second preferred embodiment of the present invention. In this embodiment, the vehicle security system includes a remote controller 3 and a security controller 31. The remote controller 3 includes control buttons 310, 320, 330, a disable button 34, and indicator lights 331, 332, 333. The security controller 31 includes a memory 311, and has sensors 321, 322, 323 and alarms 33, 34 electrically connected thereto.

The operation of this second embodiment is substantially similar to the aforesaid first embodiment with the exception that this second embodiment allows the user to set the security controller 31 for particular alert grade directly by pressing the corresponding one of the control buttons 310, 320, 330.

For example, the control button 310 is for setting the security controller 31 for the alert mode Grade 1; the control button 320 is for setting the security controller 31 for the alert mode Grade 2; the control button 330 is for setting the security controller 31 for the alert mode Grade 3. Therefore, if the car owner presses the control button 31, the indicator light 331 will be turned on, giving the message that the security controller 31 has been set for the alert mode Grade 1, and at the same time the remote controller 3 will send a control signal to the security controller 31, driving the security controller 31 to set the sensors 321, 322, 323 for the alert mode Grade 1.

Similarly, if the car owner presses the control button 320, the indicator light 332 of the remote controller 3 will be turned on, giving the message that the security controller 31 has been set for the alert mode Grade 2, and at the same time the remote controller 3 will send a control signal to the security controller 31, driving the security controller 31 to set the sensors 321, 322, 323 for the alert mode Grade 2 . If the car owner presses the control button 330, the indicator light 333 of the remote controller 3 will be turned on, giving the message that the security controller 31 has been set for the alert mode Grade 3, and at the same time the remote controller 3 will send a control signal to the security controller 31, driving the security controller 31 to set the sensors 321, 322, 323 for the alert mode Grade 3.

If the car owner presses the disable button 34, the alert mode of the security controller 31 will be disabled, i.e., the security controller 31 will be set for the non-alert mode.

Further, it is to be understood that the control buttons 310, 320, 330 provide a respective different control signal when pressed. Therefore, the security controller 21 can be alternatively set for different alert grades subject to different control signals received.

In view of the foregoing, it is known that the present invention enables the car owner to selectively set the security controller for different alert grades by means of pressing the control button, i.e., the user can set the alert grade of the vehicle security system subject to the user's different requirements.

Although the present invention has been explained in relation to its preferred embodiments, it is to be understood that many other possible modifications and variations can be made without departing from the spirit and scope of the invention as hereinafter claimed.

What is claimed is:

1. Vehicle security system comprising:
   a security controller electrically connected to at least one sensor and at least one alarm device respectively, the security controller being settable between an alert mode and a non-alert mode, the security controller including a memory storing an anti-thief alert grade table, the anti-thief alert grade table recording at least three alert grades, the alert grades each including at least one respective sensitivity default value corresponding to the at least one sensor, the at least one respective sensitivity default value defining the critical actuation value of the corresponding at least one sensor under the respective alert grade; and
   a remote controller including at least one control button for selecting one of the alert grades, and remotely driving the security controller to enter the selected alert grade of the alert modes,
   wherein the at least three alert grades include a first alert grade, a second alert grade, and a third alert grade, the sensitivity default value of the first alert grade being greater than the sensitivity default value of the second alert grade, and the sensitivity default value of the second alert grade being greater than the sensitivity default value of the third alert grade, and wherein the at least one sensor is selected from a group of a vibration sensor, a pressure sensor and a tilt sensor.

2. The vehicle security system as claimed in claim 1, wherein the remote controller sends a control signal to the security controller when one of the at least one control button is pressed, causing the security controller to set the corresponding at least one sensor in the alert grade of the alert mode which is selected subject to the received control signal.

3. The vehicle security system as claimed in claim 1, wherein the security controller enters the selected alert grade of the alert mode if the at least one control button is pressed and is not pressed again within a predetermined time.

4. The vehicle security system as claimed in claim 3, wherein the at least one alarm device includes a buzzer; when the at least one control button is pressed and is pressed again after the predetermined time, the security controller controls the buzzer to produce a corresponding short sharp sound and does not change the current selected alert grade of the alert mode.

5. The vehicle security system as claimed in claim 1, wherein the at least one alarm device includes a buzzer; when one of the at least one control button is pressed, the remote controller sends a control signal to the security controller, causing the security controller to drive the buzzer to produce a corresponding short sharp sound.

6. The vehicle security system as claimed in claim 1, wherein the memory is a nonvolatile memory.

* * * * *